Patented Dec. 24, 1946

2,413,250

UNITED STATES PATENT OFFICE 2,413,250

1,5-BIS (1-AMINO-3,5-DIOXACYCLOHEXYL) 2,4 DIOXAPENTANE

Murray Senkus, Terre Haute, Ind., assignor to Commercial Solvents Corporation, Terre Haute, Ind., a corporation of Maryland No Drawing. Application May 7, 1945, Serial No. 592,521

1 Claim. (Cl. 260—338)

This invention relates to 1,5-bis(1-amino-3,5-dioxacyclohexyl) - 2,4 - dioxapentane, and to a process for preparing it.

It relates particularly to a new composition of matter having the following structural formula:

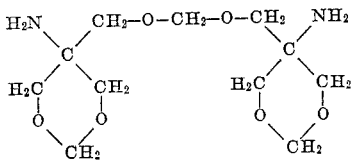

and to a method for preparing it by the catalytic hydrogenation of the corresponding dinitro compound.

The new diamine of my invention may be prepared by the catalytic hydrogenation of the corresponding dinitro compound namely, 1,5-bis(1-nitro-3,5-dioxacyclohexyl)-2,4-dioxapentane described in my copending application Serial No. 592,520, filed May 7, 1945, according to which tris(hydroxymethyl) nitromethane is reacted with an excess of formaldehyde in the presence of an acid catalyst.

In preparing my new diamine, I subject the dinitro compound to hydrogenation at elevated temperatures and pressures in the presence of a hydrogenation catalyst such as Raney nickel.

The hydrogenation may be effected at temperatures ranging from slightly above atmospheric up to the temperatures which tend to cleave the acetal linkage. I have found it preferable, however, to carry out such reactions at pressures up to about 2,000 lbs. per square inch and temperatures between about 50 and 100° C. The rate of reaction is generally directly proportional to the temperature and pressures, so that at higher temperatures, correspondingly lower pressures may be used and vice versa.

The hydrogenation is usually found to be complete in several hours under the conditions indicated.

Since the nitro compound from which my new diamine is prepared is a solid at ordinary temperatures, it is desirable to utilize a solvent during hydrogenation to aid in smooth hydrogenation and to facilitate subsequent separation and recovery of the product from the catalyst. Examples of suitable solvents are methanol, ethanol, benzene and the like.

The following example will further illustrate my invention.

Example

A mixture of 21 parts of 1,5-bis(1-nitro-3,5-dioxacyclohexyl)-2,4-dioxapentane, 400 parts of methanol and 10 parts of Raney nickel catalyst was placed in a pressure vessel. The vessel was closed, and hydrogen was led in and the mixture maintained at a temperature of about 75° C. and a pressure of about 1500 lbs. per square inch for a period of 3 hours. The vessel was then opened, the charge removed, filtered, and the product distilled at atmospheric pressure to remove the methanol. The residue was further distilled at reduced pressure, and yielded 16 parts of 1,5-bis(1-amino-3,5-dioxacyclohexyl)-2,4-dioxapentane, corresponding to a conversion of 92%. Analysis of the product gave 10.17% nitrogen as compared to a theoretical value of 10.07 calculated for $C_{11}H_{22}N_2O_6$. The refractive index of the product is $n_D^{35}$ 1.4850. Its specific gravity, $$d_{33}^{33}\ 1.2413$$

The product of my invention is a colorless viscous liquid soluble in benzene, acetone, methanol and water. It is useful in the preparation of polymeric materials by reaction of the amino groups with other organic compounds such as polybasic acids, and is also useful as an intermediate in the preparation of other organic compounds.

While the above describes the preferred embodiments of my invention, it will be understood that departures may be made therefrom within the scope of the specification and claim.

What is claimed is:

As a new composition of matter 1,5-bis(1-amino - 3,5 - dioxacyclohexyl)-2,4-dioxapentane, having the following structure:

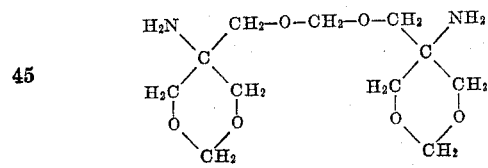

MURRAY SENKUS.